J. BIJUR.
SYSTEM OF ALTERNATING CURRENT REGULATION.
APPLICATION FILED OCT. 16, 1906.

1,014,373.

Patented Jan. 9, 1912.
2 SHEETS—SHEET 1.

Attest:
J C Sands
A K Schneider

Inventor:
Joseph Bijur
by Dickerson, Brown, Raegener + Binney
Attys

J. BIJUR.
SYSTEM OF ALTERNATING CURRENT REGULATION.
APPLICATION FILED OCT. 16, 1906.

1,014,373.

Patented Jan. 9, 1912.

2 SHEETS—SHEET 2.

Attest:
J. C. Sands
A. K. Schneider

Inventor:
Joseph Bijur
by Dickerson, Brown, Raegener
+ Binney
Attys.

UNITED STATES PATENT OFFICE.

JOSEPH BIJUR, OF NEW YORK, N. Y., ASSIGNOR, BY MESNE ASSIGNMENTS, TO THE ELECTRIC STORAGE BATTERY COMPANY, OF PHILADELPHIA, PENNSYLVANIA, A CORPORATION OF NEW JERSEY.

SYSTEM OF ALTERNATING-CURRENT REGULATION.

1,014,373.  Specification of Letters Patent.  Patented Jan. 9, 1912.

Application filed October 16, 1906. Serial No. 339,184.

*To all whom it may concern:*

Be it known that I, JOSEPH BIJUR, a citizen of the United States, and resident of the borough of Manhattan, city, county, and State of New York, have invented certain new and useful Improvements in Systems of Alternating-Current Regulation, of which the following is a specification, accompanied by drawings.

This invention relates to a system of alternating current regulation, and has for its object to utilize the energy of a fly wheel to compensate for the fluctuations on the work circuit of an alternating current system, and thereby maintain the load on the main generator substantially constant without the use of storage batteries or other auxiliary means for this purpose.

Further objects of this invention will hereinafter appear and the invention consists of a system for carrying out the above objects embodying the apparatus and arrangement of circuits substantially as hereinafter fully described and claimed in this specification and shown in the accompanying drawings, in which,—

Figure 1:
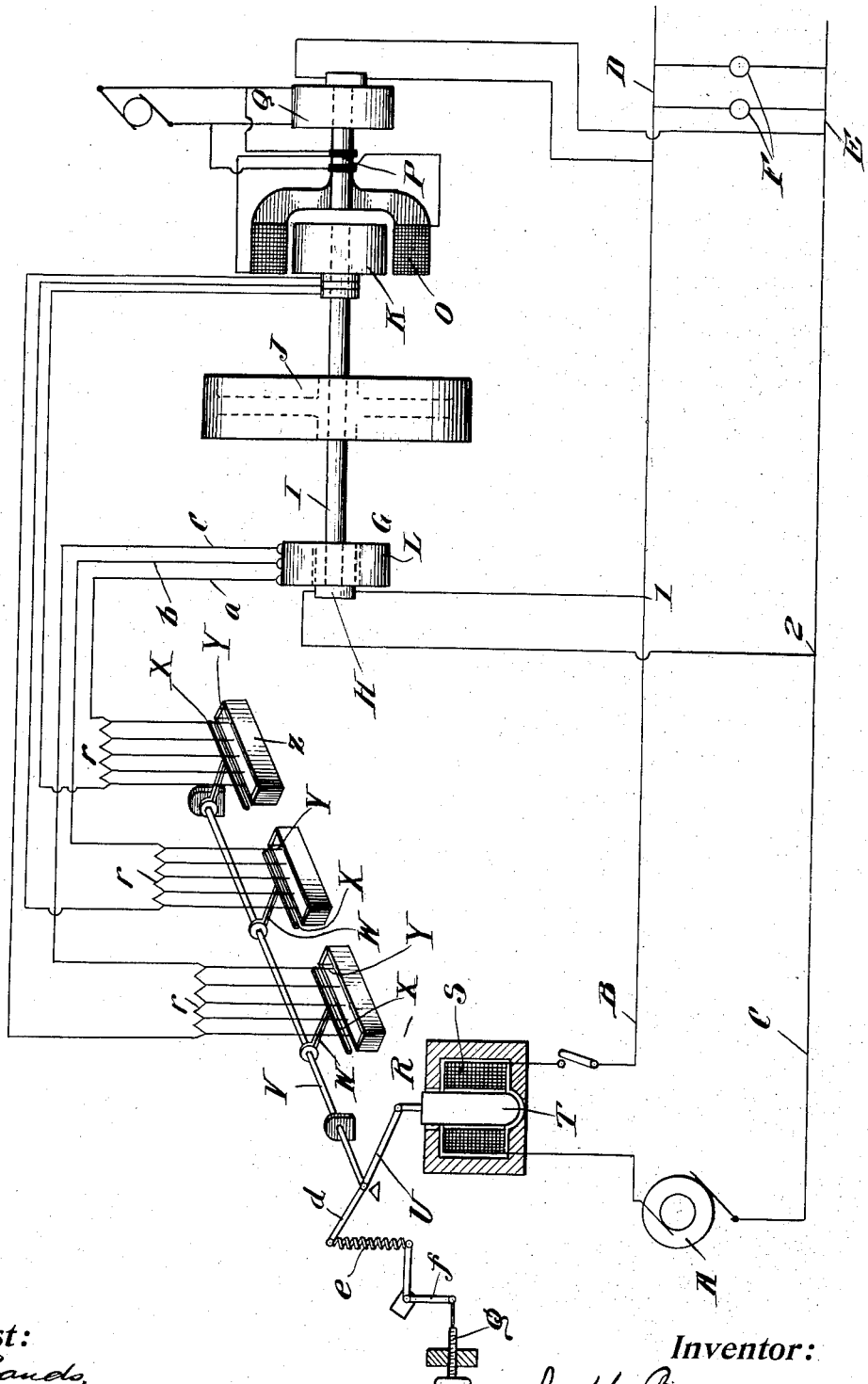
Figure 2:
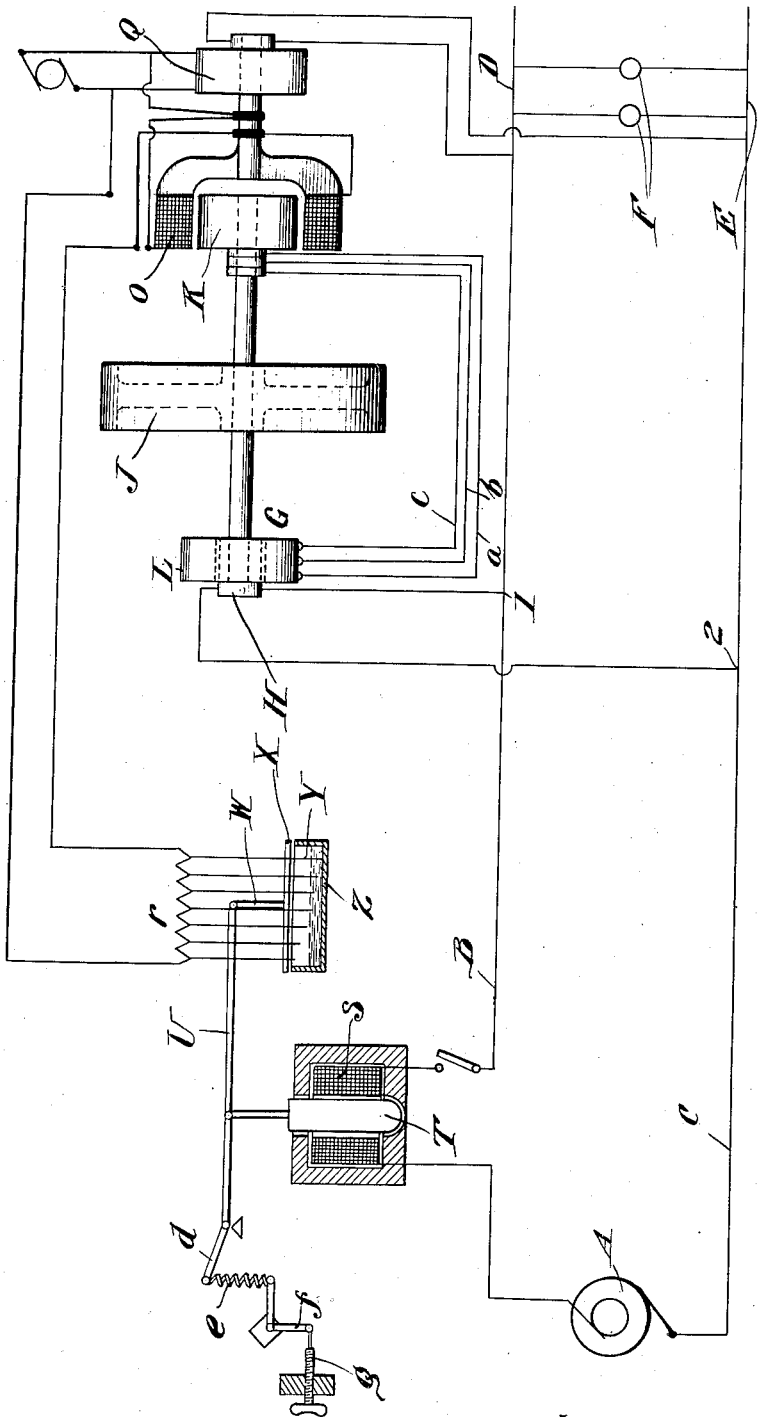

Figure 1 is a diagrammatic representation of circuits and apparatus for carrying out the invention, and Fig. 2 is a partial diagram illustrating a modification of a portion of the circuits.

Referring to the drawings A represents the main alternating current generator, in this instance assumed to be a single phase generator by way of illustration, to which are connected the mains B and C and the work circuit D and E. The load is represented as by means of the motors F.

According to this invention the armature H of the auxiliary alternating current generator G is connected in the work circuit between the points 1 and 2, and as shown the armature shaft I is provided with a suitable fly wheel J. The energy given up or absorbed by the fly wheel J depends upon the change in its speed, and means are provided to maintain the frequency of the generator G substantially constant regardless of the changes in the speed of the fly wheel J, as otherwise the alternator G cannot act in parallel with the main generator A. Any suitable means may be provided for compensating for the changes in speed of the fly wheel J, and in this instance I have shown an exciter armature K mounted upon the same shaft I with the armature H of the alternator G. The field of the alternator G is laminated and the alternator K delivers three phase current to said field windings L of said field. The field windings O of the exciter K are energized by direct current from any suitable source and the whole field is revoluble, in this instance said field being connected to the shaft P upon which is mounted a synchronous motor Q, the armature of which is energized by alternating current, as for instance of the work circuit D E while the field is energized by any suitable source of direct current.

Suitable means are provided for regulating either the energization of the field coils L of the alternator G or the field coils O of the exciter K. In Fig. 1 the regulator is shown regulating the field coils L and this regulator R is preferably connected in circuit between the main alternator A and the auxiliary alternator G.

Any suitable form of regulator may be used, but I prefer the form shown in the drawings, in which the magnet coils S are connected to the circuit of the main B, while the magnet core T is connected to an arm U carried by a rock shaft V pivoted in suitable bearings. The rock shaft V is provided in this instance with three other arms W which carry cross arms X, each provided with contact points Y adapted to dip into the mercury cups Z. These contact points taper in length from one end to the other and are connected as shown to series of resistances $r$ shown connected in the leads $a$, $b$ and $c$, which connect the armature of the exciter K with the field coils L of the alternator G. The rock shaft V is also provided with a shorter arm $d$ on the opposite side from the arm U and extending upwardly at an angle. This arm $d$ is connected to a retracting spring $e$, to which is in turn connected means for varying the tension of said spring, as for instance a bell crank lever $f$ and adjusting screw $g$. The object of the construction described in connection with the arm $d$ and a spring $e$ is to afford a substantially constant opposition to the movement of the magnet core T, in this instance the moment of the force of the spring around the axis of the rock shaft being substantially constant.

Let it be assumed that the armature H of the alternator G rotates clockwise at a given speed of, for instance 1000 revolutions per minute, the armature of the exciter K being connected to the shaft I will rotate in the same direction at the same speed. Let it also be assumed that the field O of the exciter K, which has preferably the same number of poles as the field of the alternator G, is driven by the synchronous motor Q in the same direction as the armature H, but at a higher speed, as for instance two thousand revolutions per minute. Assuming that the fields O and L each have six poles, then a three phase current will be generated by the exciter K having a frequency of three thousand per minute. The leads a, b, c are connected to the three phase winding of the generator G in such manner as to produce a rotary field rotating counter-clockwise, and therefore the rotation of the field L will be one thousand per minute, and the frequency of the generator will be the same as if it were running two thousand revolutions per minute clockwise in a stationary field.

According to the construction and arrangement described any change in the speed of the fly wheel J and the consequent change in the speed of the armature H, which would tend to alter the frequency of the alternator G, will be compensated for by the relative speed between the armature of the exciter K and its revolving field O.

Let it be assumed that the frequency of the main alternating current from the alternator A is such that it corresponds to the frequency of the armature H of alternator G when the shaft I is running at two thousand revolutions per minute, and the armature H is rotating in a stationary field L. According to the construction described, since the armature H is revolving clockwise at a thousand revolutions per minute and the field is revolving counter-clockwise at a thousand revolutions per minute, a frequency of armature H is produced the equivalent of two thousand revolutions per minute of the armature in a stationary field. Upon an increase of load upon the work circuit D E, the core T of the regulator R is attracted by the increase in energization of the magnet S, and the rock shaft V is rotated in such a direction as to dip the contact points Y into the mercury cup Z, thereby short-circuiting equal portions of the resistances r in the three phase connections a, b, c. The field L of the alternator G is therefore strengthened and the voltage of the alternator increased. This causes the alternator G to take some of the load and the fly wheel J is slowed down which would drop the alternator out of step with the main generator A without the compensating devices constructed in accordance with this invention. As the fly wheel J slows down, the speed of the armature of the exciter K is slowed down, and let it be assumed that the speed of the shaft I is now five hundred revolutions per minute instead of one thousand. The difference between the speed of the armature of the exciter K and the speed of the field O has therefore increased to fifteen hundred revolutions per minute, and the frequency of its current has increased from three thousand to four thousand five hundred per minute, secondly the counter-clockwise rotation of the field L of alternator G has increased to fifteen hundred per minute, thereby maintaining the frequency of the alternator G substantially what it was before because the difference between the revolutions per minute of the armature and field remains substantially unchanged. When the load on the work circuit falls the regulator R introduces resistance into each of the three phase connections a, b, c, thereby weakening the field of alternator G and reducing the voltage of said machine. On account of the voltage of the alternator G being less than that of the system, current will be absorbed and the machine G will run as a motor. The speed of the fly wheel J will be increased and let it be assumed that the shaft I is rotated at fifteen hundred revolutions per minute instead of one thousand. This condition will be taken care of by the apparatus and the frequency of the alternator G will remain substantially unchanged as before.

The weight and speed of the fly wheel would be so chosen that with an average load in the system the fly wheel will, by its changes in speed, compensate for increases and decreases of the current on the work circuit. The tension of the regulator spring should be so adjusted when the load on the work circuit is average that the field of the alternator G is of such strength that the armature H neither absorbs nor gives up the energy.

The phase of the alternator G should substantially coincide with the phase of the main generator A at all times, and this condition is brought about by suitably adjusting the angle between the field O of the exciter K and the field of the synchronous motor Q in any desired manner, as for instance by adjusting the rotary position of the armature of the motor Q on the shaft P or by turning the field of the motor Q to the desired angle.

In the operation of the apparatus, after the main generator A is started the synchronous motor Q may be started in any suitable manner, thereby causing the field O of the exciter K to rotate. The fly wheel may be started in any suitable manner and the regulator R may then be thrown into circuit by means of a suitable switch, where-upon if the work circuit is lightly loaded there will be a substantial amount of resistance included in the three phase leads $a$, $b$, $c$, and the rush of current into the armature H of the alternator G will maintain the rotation of the fly wheel J. The current in the armature H will increase until the action of the regulator in cutting out resistance in the three phase leads $a$, $b$, and $c$ sufficiently strengthens the field of the alternator G and the voltage of the armature H to produce average load upon the main generator A which conditions will be maintained until the regulator is again brought into action by changes in load on the work circuit.

In the modification of the apparatus shown in Fig. 2 the circuits and connections are the same as in Fig. 1, with the exception that instead of three resistances $r$ controlled by the regulator, there is but one resistance $r$, which is connected in the circuit of the field coils of the field O of the exciter K instead of in the three phase leads $a$, $b$, $c$. The regulator R operates as before and upon increase of load on the work circuit the field of the exciter K is strengthened, thereby increasing the voltage of the field of the alternator G and causing the alternator to furnish current to the line if desired. On the other hand when the load on the work circuit decreases the field O of the exciter K is weakened, thereby weakening the field of the alternator G and causing it to absorb current from the line.

Where the fly wheel generator set is used to compensate for fluctuations in alternating current circuits, I may prefer to employ a magnetically rotating exciter field instead of the field mechanically rotated by the synchronous motor. In this case the number of poles of the field may be so chosen that magnetic rotation of the field around the armature shaft I of the fly wheel takes place at a substantially higher speed than the maximum speed of the fly wheel.

Obviously some features of this invention may be used without others and the invention may be embodied in widely varying forms.

Therefore, without limiting the invention to the devices shown and described, and without enumerating equivalents, I claim and desire to obtain by Letters Patent the following:

1. In a system of alternating current regulation, the combination with the main alternator and work circuit, of an auxiliary alternator, the ratio between the speeds of the two armatures thereof being variable, and means for maintaining said alternators in synchronism when the armatures are revolving at different speeds.

2. In a system of alternating current regulation, the combination with the main alternator and work circuit, of an auxiliary alternator connected to compensate for changes on the work circuit, the ratio between the speeds of the two armatures thereof being variable, and means for maintaining said alternators in synchronism when the armatures are revolving at different speeds.

3. In a system of alternating current regulation, the combination with the main alternator and work circuit, of an auxiliary alternator, the ratio between the speeds of the two armatures thereof being variable, a fly-wheel connected to the auxiliary alternator and means for maintaining said alternators in synchronism when the armatures are revolving at different speeds.

4. In a system of alternating current regulation, the combination with the main alternator and work circuit, of an auxiliary alternator, a fly wheel connected thereto, means for causing the fly wheel to absorb a substantial amount of energy from or impart a substantial amount of energy to the work circuit, and means for maintaining said alternators in synchronism.

5. In a system of alternating current regulation, the combination with the main alternator and work circuit, of an auxiliary alternator, the ratio between the speeds of the two armatures thereof being variable, a fly-wheel connected to said auxiliary alternator, means for causing a substantial amount of energy to be absorbed from or imparted to the work circuit by the acceleration or retardation of the fly wheel, and means for maintaining said alternators in synchronism when the armatures are revolving at different speeds.

6. In a system of alternating current regulation, the combination with the main alternator and work circuit, of an auxiliary alternator whose frequency is the result of the rotation of its armature and the rotation of its field, and means for maintaining said alternators in synchronism.

7. In combination a main alternator and work circuit, an auxiliary alternator provided with stator and rotor windings whereof one is connected to the work circuit and means for supplying current at varying frequencies to the other winding to maintain synchronism between the two alternators.

8. In a system of alternating current regulation, the combination with the main alternator and work circuit, of an auxiliary alternator connected to compensate for changes on the work circuit, a fly wheel connected to the shaft of said alternator, said fly wheel being adapted to absorb energy from the line when the auxiliary alternator is acting as a motor, and said fly wheel being adapted to supply energy when the auxiliary alternator is acting as a generator, the ratio between the speeds of the armatures of the main and auxiliary alternators being variable, and means for maintaining said alternators in synchronism when the armatures are revolving at different speeds.

9. In a system of alternating current regulation, the combination with the main alternator and work circuit, of an auxiliary alternator connected to compensate for changes on the work circuit, a fly wheel connected to the shaft of said alternator, said fly wheel being adapted to absorb energy from the line when the auxiliary alternator is acting as a motor, and said fly wheel being adapted to supply energy when the auxiliary alternator is acting as a generator, the ratio between the speeds of the armatures of the main and auxiliary alternators being variable, and means for maintaining said alternators in synchronism when the armatures are revolving at different speeds, and a regulator responsive to changes on the work circuit for varying the field of the auxiliary generator.

10. In combination a main alternator and work circuit, an auxiliary alternator provided with stator and rotor windings whereof one is connected to the work circuit and means for supplying current at varying frequencies to the other winding to maintain synchronism between the two alternators, and a fly-wheel mechanically connected to the rotor of the auxiliary alternator.

11. In a system of alternating current regulation, the combination with the main alternator and work circuit of an auxiliary alternator, an armature therefor connected to the work circuit, a flywheel on the shaft of the armature, and means for automatically varying the frequency of the field of the auxiliary generator to compensate for variations in armature speed due to changes in load.

12. In a system of alternating current regulation, the combination with the main alternator and work circuit of an auxiliary alternator, an armature therefor connected to the work circuit, a flywheel on the shaft of the armature, a third alternator mounted on said shaft and having a revoluble field, connections between the armature of such third alternator and the field of the second and a load controlled automatic regulator for varying the resistance in such connections.

13. In combination a main alternator and work circuit, an auxiliary alternator provided with stator and rotor windings whereof one is connected to the work circuit and means for supplying current at varying frequencies to the other winding to maintain synchronism between the two alternators, means for storing and delivering energy with changes of speed, and mechanical means for transmitting energy between the last mentioned means and the rotor.

14. In combination an alternating current circuit, an alternating current dynamo having a rotor and a stator winding whereof one is connected to the circuit and means for supplying to the other winding alternating currents of a frequency varying with and oppositely to the variations of rotor speed, said means including a field and armature in inductive relation, whereof one is mechanically connected to the rotor and the other is driven at constant speed.

15. In combination an alternating current circuit, an alternating current dynamo having a rotor and a stator winding whereof one is connected to the circuit and means for supplying to the other winding alternating currents of a frequency varying with and oppositely to the variations of rotor speed, said means including a field and armature in inductive relation, whereof one is mechanically connected to the rotor and the other is driven at constant speed, and a flywheel mechanically connected to the rotor.

In testimony whereof I have signed this specification in the presence of two subscribing witnesses.

JOSEPH BIJUR.

Witnesses:
OLIN A. FOSTER,
A. K. SCHNEIDER.